(12) United States Patent
Ozaki

(10) Patent No.: US 10,505,291 B2
(45) Date of Patent: Dec. 10, 2019

(54) CONDUCTOR CONNECTION STRUCTURE OF PLATE-LIKE ROUTING MEMBERS

(71) Applicant: YAZAKI CORPORATION, Tokyo (JP)

(72) Inventor: Masahito Ozaki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/112,606

(22) Filed: Aug. 24, 2018

(65) Prior Publication Data

US 2019/0067839 A1 Feb. 28, 2019

(30) Foreign Application Priority Data

Aug. 25, 2017 (JP) ................................ 2017-162542

(51) Int. Cl.
| | |
|---|---|
| *H01R 9/24* | (2006.01) |
| *H01R 4/58* | (2006.01) |
| *H01R 4/34* | (2006.01) |
| *H01B 7/00* | (2006.01) |
| *H01R 43/16* | (2006.01) |
| *H01R 11/12* | (2006.01) |

(52) U.S. Cl.
CPC ............. *H01R 4/58* (2013.01); *H01B 7/0009* (2013.01); *H01R 4/34* (2013.01); *H01R 43/16* (2013.01); *H01R 11/12* (2013.01)

(58) Field of Classification Search
CPC . H01R 4/58; H01R 4/34; H01R 43/16; H01R 11/12; H01B 7/0009

USPC ........................................ 439/212, 213, 884
See application file for complete search history.

(56) References Cited

U.S. PATENT DOCUMENTS

| | | | | |
|---|---|---|---|---|
| 7,202,415 | B2 * | 4/2007 | Fujita | ................. B60R 16/0207 174/69 |
| 7,320,608 | B2 * | 1/2008 | Kubota | ............... B60R 16/0238 439/620.01 |
| 10,003,235 | B2 * | 6/2018 | Hernandez | ............. H02K 5/225 |
| 2002/0151197 | A1 | 10/2002 | Kawakita et al. | |

FOREIGN PATENT DOCUMENTS

| | | |
|---|---|---|
| CN | 107039112 A | 8/2017 |
| JP | 4-319267 A | 11/1992 |
| JP | 2002-315154 A | 10/2002 |

* cited by examiner

*Primary Examiner* — Khiem M Nguyen
(74) *Attorney, Agent, or Firm* — Kenealy Vaidya LLP

(57) ABSTRACT

A conductor connection structure includes a first plate-like routing member, a second plate-like routing member and a connection mechanism. The first plate-like routing member includes a first flat conductor and a first insulative coating which covers the first flat conductor. A first conductor piece is continuously extended from the first flat conductor at one longer edge of the first plate-like routing member and is exposed from the first insulative coating. The second plate-like routing member includes a second flat conductor and a second insulative coating which covers the second flat conductor. A second conductor piece is continuously extended from the second flat conductor at one longer edge of the second plate-like routing member and is exposed from the second insulative coating. The connection mechanism connects the first conductor piece and the second conductor piece to each other electrically.

5 Claims, 6 Drawing Sheets

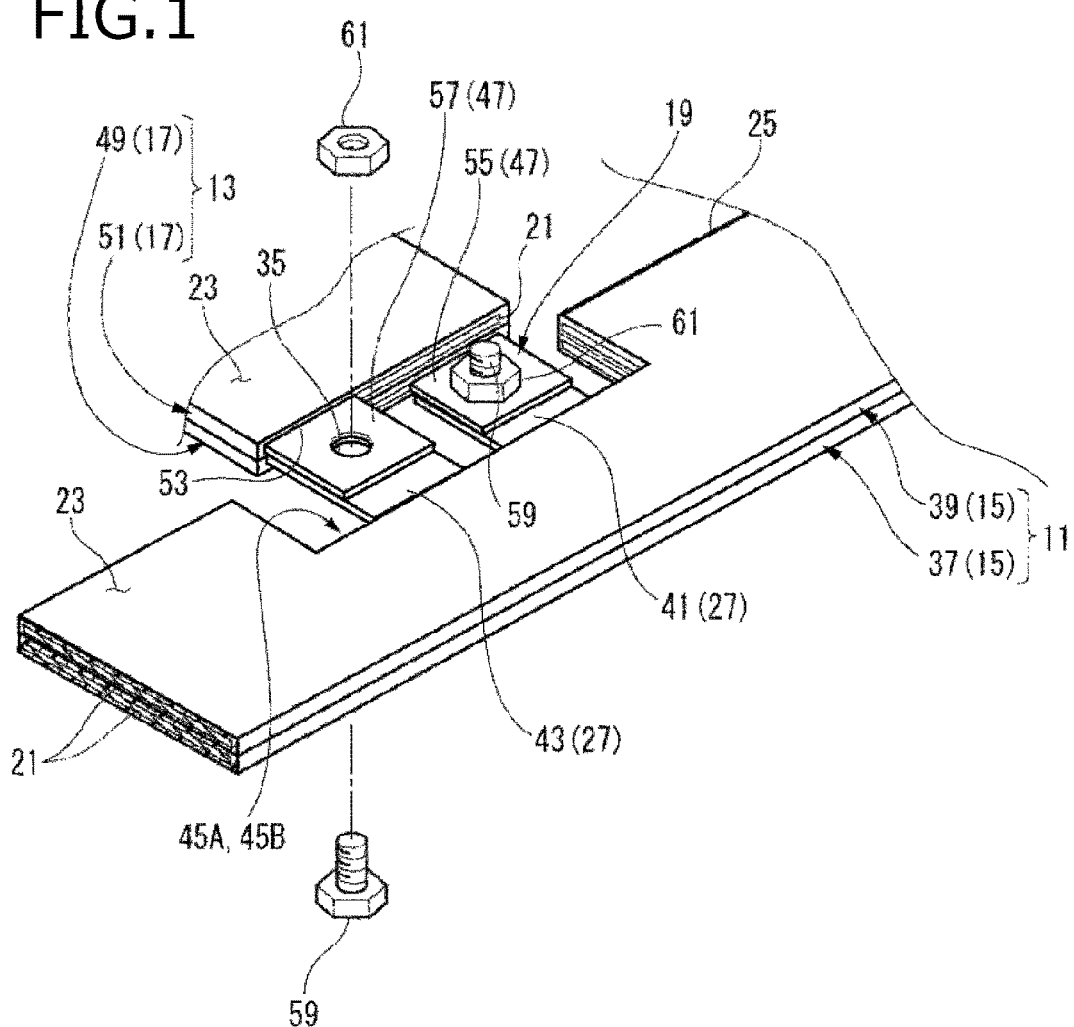

CONDUCTOR CONNECTION STRUCTURE OF PLATE-LIKE ROUTING MEMBERS

CROSS REFERENCE TO RELATED APPLICATIONS

This application is based on Japanese Patent Application (No. 2017-162542) filed on Aug. 25, 2017, the contents of which are incorporated herein by reference.

BACKGROUND OF THE INVENTION

1. Field of the Invention

The present invention relates to a conductor connection structure of plate-like routing members.

2. Description of the Related Art

Electric wires that are routed in a vehicle are connected by various methods. For example, JP-A-4-319267 discloses a branching connection device in which a connector is attached to tip portions of electric wired that lead from a desired position of a wire harness. The wire harness is connected to a branching circuit by attaching the connector to a connector attaching portion that is provided in the branching connection device.

JP-A-2002-315154 discloses a method for connecting a junction box and a wire harness in which conductive members are wired in the Y direction parallel with each other on one surface of an insulative plate and electric wires are wired in the X direction on the other surface of the insulative plate so as to cross the conductive members. In each electric wire, a core wire is exposed in one end portion and the other end portion is connected to a terminal. The conductive members and the electric wires are electrically connected to each other at the crossing points by ultrasonic welding or resistance welding. Terminals are inserted in a connector.

However, in the branching technique disclosed in JP-A-4-319267 which uses the connector connection, a large number of components are necessary because it is necessary to prepare plural connectors each consisting of terminals and a housing. In the branching technique disclosed in JP-A-2002-315154 in which electric wires are welded to the respective conductive members, it is necessary to prepare electric wires having different lengths that are suitable for an associated circuit and connection work is complicated because end portions of the electric wires need to be placed at respective welding positions and then welded.

SUMMARY OF THE INVENTION

The present invention has been made in view of the above circumstances, and an object of the invention is therefore to provide a conductor connection structure of plate-like routing members capable of decreasing the number of components by dispensing with connectors as well as making connection work easier.

The above object is attained by the following configurations:

(1) A conductor connection structure of plate-like routing members, the conductor connection structure including:
a first plate-like routing member including:
a first flat conductor having a band-shape; and
a first insulative coating which covers an outer surface of the first flat conductor, and the first plate-like routing member being formed with, at one longer edge thereof, a first conductor piece that is continuously extended from the first flat conductor as a part of the first flat conductor and that is exposed from the first insulative coating;
a second plate-like routing member including:
a second flat conductor having a band-shape; and
a second insulative coating which covers an outer surface of the second flat conductor, and the second plate-like routing member being formed with, at one shorter edge thereof, a second conductor piece that is continuously extended from the second flat conductor as a part of the second flat conductor and that is exposed from the second insulative coating; and
a connection mechanism which connects the first conductor piece and the second conductor piece to each other electrically.

In the conductor connection structure of plate-like routing members having the configuration of item (1), the first band-shaped plate-like routing member is formed with, on its one longer edge, the first conductor piece which is a continuous part of the first flat conductor, the first conductor piece being exposed from the first insulative coating. The first flat conductor of the first counterpart plate-like routing member is connected to this first plate-like routing member. The second plate-like routing member is formed with, on one shorter edge (i.e., on one shorter edge located at one end, in its longitudinal direction, of the second band-shaped plate-like routing member), the second conductor piece which is a continuous part of the second flat conductor. That is, the second band-shaped counterpart plate-like routing member extends perpendicularly to and is electrically connected to the side edge of the second band-shaped plate-like routing member. Since the first plate-like routing member and the second plate-like routing member are connected to each other by directly connecting the exposed conductor piece and second conductor piece of their flat conductors by the connection mechanism using, for example, fastening members, welding, or the like, it is not necessary to prepare a connector.

The first conductor piece and the second conductor piece can be formed easily by pressing the first and second flat conductors. Thus, in the conductor connection structure of plate-like routing members having the above configuration, unlike in the conventional method, it is not necessary to prepare plural electric wires having different lengths that are suitable for an associated circuit and do complicated work of, for example, arranging end portions of the respective electric wires at respective welding positions and welding them.

(2) The conductor connection structure of plate-like routing members according to item (1), wherein the first conductor piece is formed by removing a portion, located at the one longer edge of the first plate-like routing member and having a prescribed shape.

In the conductor connection structure of plate-like routing members having the configuration of item (2), the first conductor piece is formed by removing the portion(s), located on the one longer edge and having the prescribed shape(s), of the first plate-like routing member by press working, for example. That is, a portion(s) having a prescribed shape(s) (e.g., a portion, located on the one longer edge and having an approximately U shape, of the first plate-like routing member) is removed, whereby the first conductor piece is formed on the one longer edge of the first plate-like routing member so as to project from the bottom of a recess.

Thus, the first conductor piece exists within the recess, that is, does not project outward beyond the one longer edge in the width direction (which is perpendicular to the longitudinal direction of the plate-like routing member). Existing within the recess, the first conductor piece is less prone to receive interference from other members. That is, the first conductor piece is less prone to be deformed or damaged by external force that is incurred by, for example, a collision with another member. In addition, since the first conductor piece exists within the recess, the space that is occupied by the conductor connection structure can be reduced.

(3) The conductor connection structure of plate-like routing members according to item (1) or (2), further including:
    a third plate-like routing member including:
        a third flat conductor having a band-shape; and
        a third insulative coating which covers an outer surface of the third flat conductor, and the third plate-like routing member being formed with, at one longer edge thereof, a third conductor piece that is continuously extended from the third flat conductor as a part of the third flat conductor and that is exposed from the third insulative coating;.
    wherein when the first plate-like routing member and the third plate-like routing member are laid on each other, the first conductor piece and the third conductor piece are spaced from each other and are located close to each other.

In the conductor connection structure of plate-like routing members having the configuration of item (3), the connection mechanisms can be disposed adjacent to each other at approximately the same positions of the first and third plate-like routing members that are laid on each other, whereby connection work is made easier. Plural circuits can be connected without changing the dimensions of the respective plate-like routing members in their width direction. Since the first and third plate-like routing members are used which are formed with the respective conductor pieces at prescribed positions in advance, the plural conductor pieces can be disposed at the prescribed positions merely by laying the first and third plate-like routing members on each other.

For example, the one longer edge is one of both side edge portions of the first plate-like routing member in a direction perpendicular to an extending direction of the first plate-like routing member.

For example, the one shorter edge is one of both side edge portions of the second plate-like routing member in an extending direction of the second plate-like routing member.

The conductor connection structure of plate-like routing members according to the invention can decrease the number of components by dispensing with connectors as well as make connection work easier.

The invention has been described above concisely. The details of the invention will become more apparent when the modes for carrying out the invention (hereinafter referred to as embodiments) described below are read through with reference to the accompanying drawings.

BRIEF DESCRIPTION OF THE DRAWINGS

FIG. 1 is a perspective view of a conductor connection structure of plate-like routing members according to a first embodiment of the present invention which includes a laminated routing body and a counterpart laminated routing body.

DETAILED DESCRIPTION OF THE EXEMPLARY EMBODIMENTS

Figure 2A:
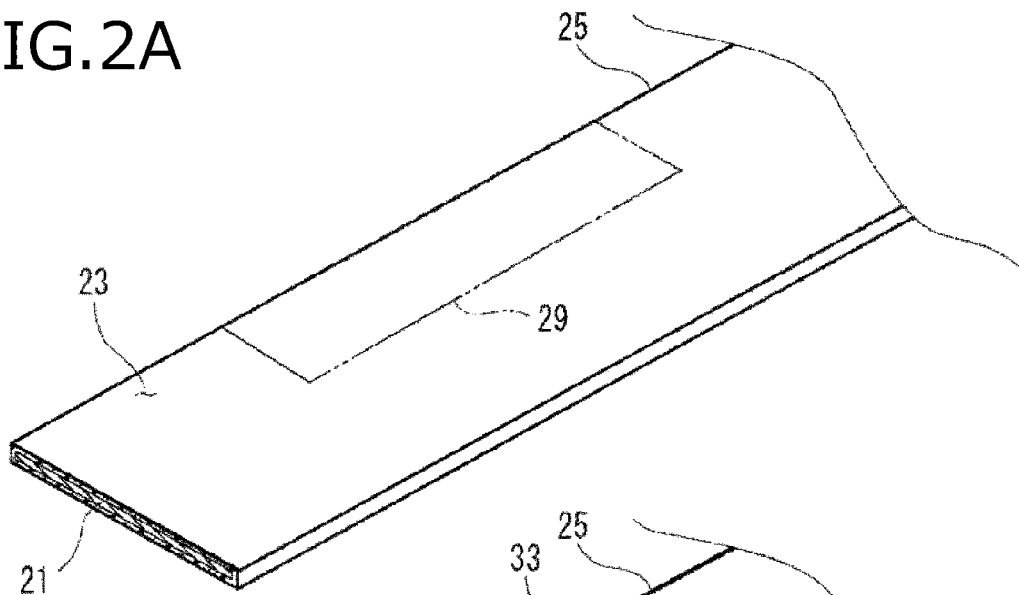
FIGS. 2A to 2C are process diagrams illustrating a process for forming a conductor piece in a bottom plate-like routing member shown in FIG. 1.

Embodiments of the present invention will be hereinafter described with reference to the drawings.

FIG. 1 is a perspective view of a conductor connection structure of plate-like routing members according to a first embodiment of the invention. The conductor connection structure includes a laminated routing body (a first laminated routing body) 11 and a counterpart laminated routing body (a second laminated routing body) 13. The conductor connection structure of plate-like routing members according to a first embodiment includes, as main components, plate-like routing members 15, counterpart plate-like routing members 17, and connection mechanisms 19.

Each plate-like routing member 15 has a band-shaped flat conductor 21. The outer circumferential surfaces of the flat conductor 21 are covered with an insulative coating 23. For example, the flat conductor 21 be made of aluminum, an aluminum alloy, copper, a copper alloy, or the like. The flat conductor 21 is thin and rectangular in cross section taken perpendicularly to its longitudinal direction. The above-mentioned term "outer circumferential surfaces" of the flat conductor 21 are its surfaces excluding both end surfaces in the longitudinal direction, that is, the top and bottom surfaces and the left and right side surfaces which are continuous with each other. The width of each plate-like routing member 15 is far greater than its thickness (the width direction is perpendicular to the thickness direction and the longitudinal direction).

The insulative coating 23 may be made of any insulating material as long as it can insulate the flat conductor 21 of the plate-like routing member 15 electrically. For example, the insulative coating 23 can be formed on the outer circumferential surfaces of the flat conductor 21 by powder coating. Two main examples of powder coating are electrostatic coating (spray coating) and fluidized bed coating (dip coating), either of which may be used to form the insulative coating 23. Plural plate-like routing members 15 are laid on each other after the insulative coating 23 is formed on each plate-like routing member 15.

Each plate-like routing member 15 has, on its one longer edge 25, a conductor piece 27 which is a continuous part of the flat conductor 21, an extension tip portion of the conductor piece 27 being exposed from the insulative coating 23. The conductor piece 27 may either extend outward from or beyond the longer edge 25 in the width direction or be formed within the width of the plate-like routing member 15. The first embodiment is of the latter case.

Figure 2B:
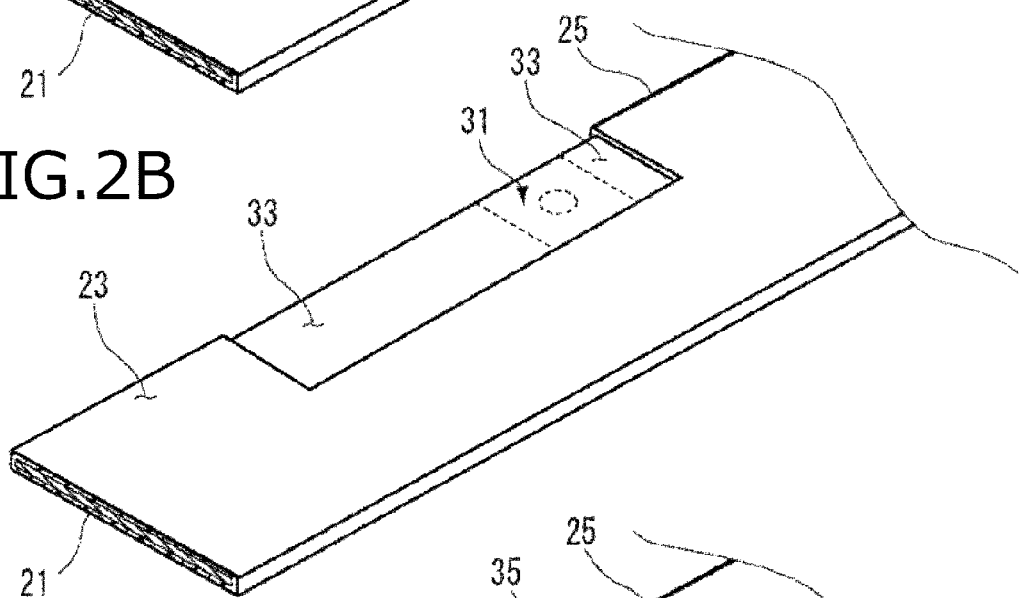
Figure 2C:
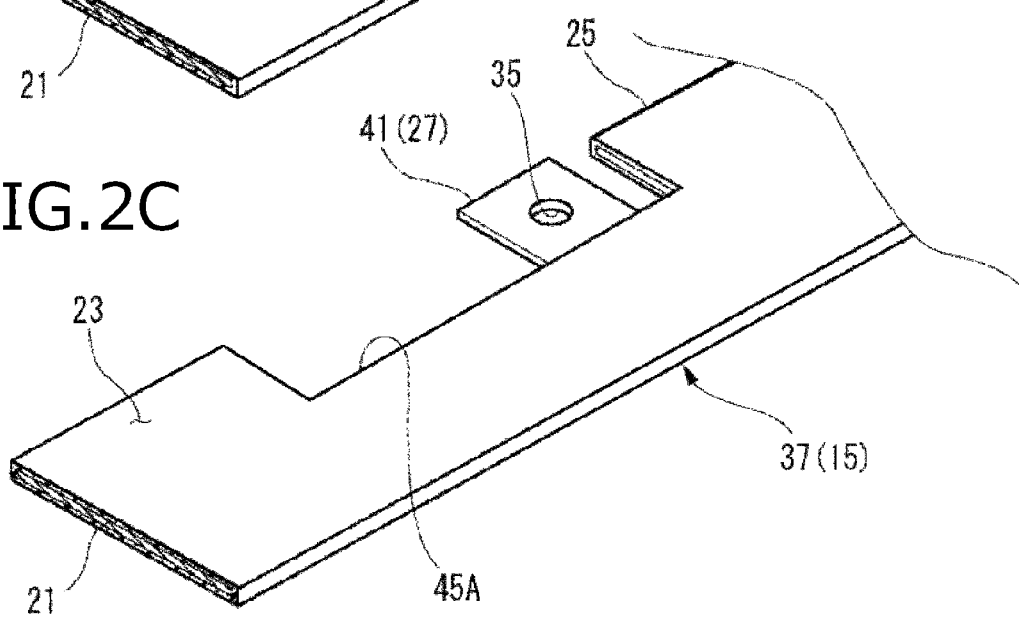

FIGS. 2A-2C are process diagrams illustrating a process for forming a conductor piece 27 in the bottom plate-like routing member 15 shown in FIG. 1.

In a step of coating the flat conductor 21 with an insulative coating 23, a portion (where to form a conductor piece 27), on one longer edge 25, of the flat conductor 21 is masked. As shown in FIG. 2A, the flat conductor 21 is masked by a rectangular adhesive sheet 29 that is stuck to a portion, on the one longer edge 25, of the flat conductor 21 from the top side and the bottom side.

After completion of the coating step, the adhesive sheet 29 is removed, whereby as shown in FIG. 2B a rectangular conductor-exposed portion 31 of the flat conductor 21 appears in the portion on the one longer edge 25. The conductor-exposed portion 31 is punched by press working using a prescribed die, whereby a conductor piece 27 having a desired shape is formed as shown in FIG. 2C. That is, a portion(s) 33 having a prescribed shape(s) is removed from the conductor-exposed portion 31. At this time, a bolt hole 35 through which to insert a fastening member (a member of a connection mechanism 19) may also be formed through the conductor piece 27.

Figure 3:
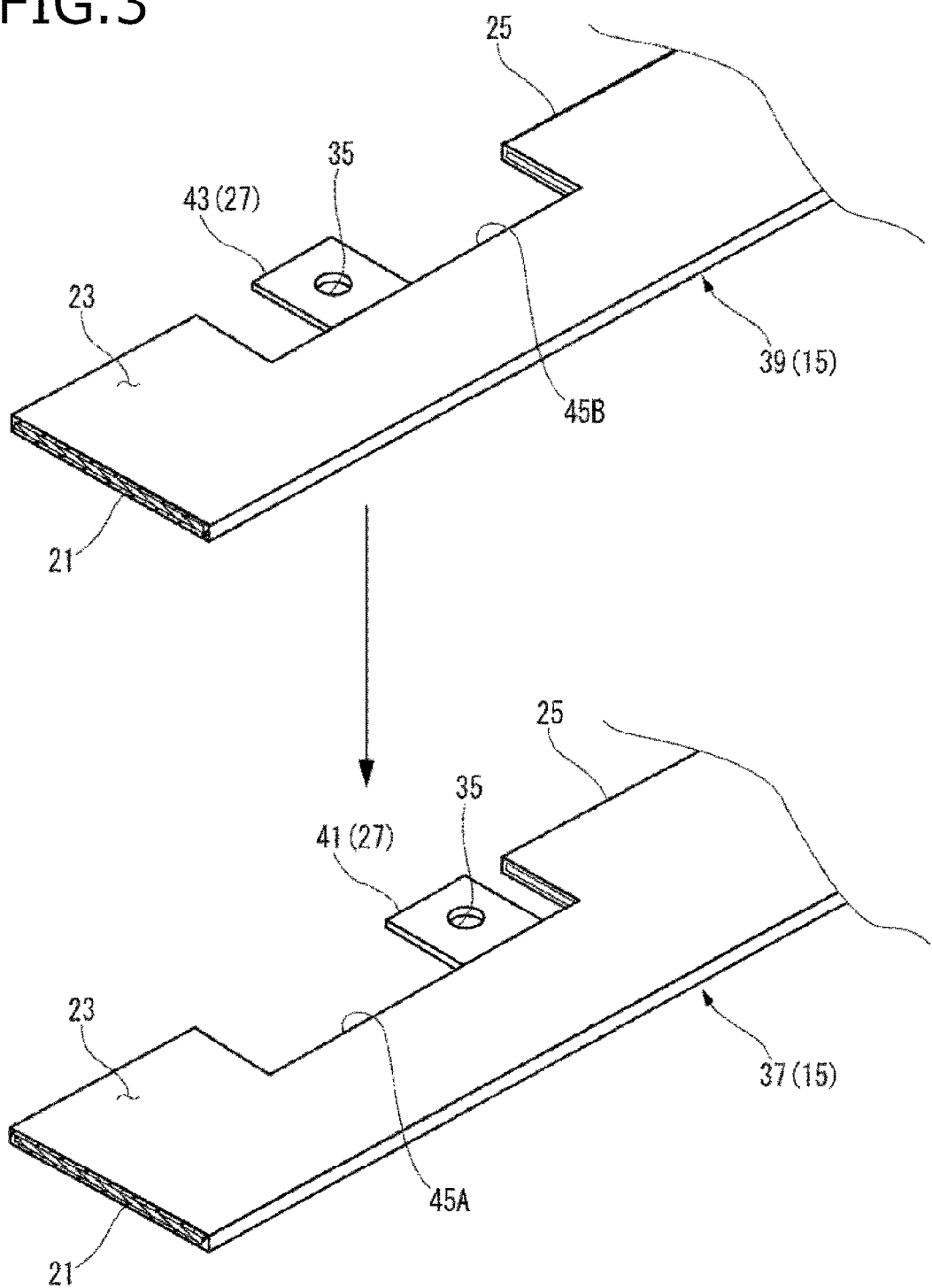
FIG. 3 is an exploded perspective view showing the bottom plate-like routing member and a top plate-like routing member.

FIG. 3 is an exploded perspective view showing the bottom plate-like routing member 15 and the top plate-like routing member 15. Plural plate-like routing members 15 can be laid on each other. When laid on each other with the flat conductors 21 separated from each other by the insulative coatings 23, the plural plate-like routing members 15 constitute a laminated routing body 11 in which the plate-like routing members 15 serve as independent circuits of the same number as the number of lamination layers.

There are no particular limitations on the number of lamination layers; two laminated routing bodies 11 may be laid on each other as shown in FIG. 1 and three or four laminated routing bodies 11 may be laid on each other. In the first embodiment, the two-layer laminated routing body 11 is formed by laying a first-layer plate-like routing member 37 (bottom plate-like routing member) and a second-layer plate-like routing member 39 on each other. The abovementioned term "plate-like routing member 15" is a generic term of the first-layer plate-like routing member 37 and the second-layer plate-like routing member 39.

As shown in FIG. 3, the first-layer plate-like routing member 37 and the second-layer plate-like routing member 39 are formed with a first conductor piece 41 and a second conductor piece 43, respectively, by removing the portion 33, located on the one longer edge and having approximately a U shape, of each plate-like routing member 15. The first conductor piece 41 is formed so as to project from the bottom of a recess 45A by removing the portion 33, located on the one longer edge 25 and having approximately a U shape, of the first-layer plate-like routing member 37. The first conductor piece 41 is located inside the recess 45A. The second conductor piece 43 is formed so as to project from the bottom of a recess 45B by removing the portion 33, located on the one longer edge 25 and having approximately a U shape, of the second-layer plate-like routing member 39. The second conductor piece 43 is located inside the recess 45B.

The recess 45A of the first-layer plate-like routing member 37 and the recess 45B of the second-layer plate-like routing member 39 are formed by punching so as to have the same outline shape. On the other hand, the first conductor piece 41 of the first-layer plate-like routing member 37 and the second conductor piece 43 of the second-layer plate-like routing member 39 are located at different positions relative to the recesses 45A and 45B, respectively, that is, deviated from each other in the longitudinal direction of the plate-like routing member 15.

That is, in the conductor connection structure of plate-like routing members according to the first embodiment, the first-layer plate-like routing member 37 and the second-layer plate-like routing member 39 are laid on each other so that the first conductor piece 41 and the second conductor piece 43 are spaced from each other and located close to each other in the respective recesses 45A and 45B.

Figure 4:
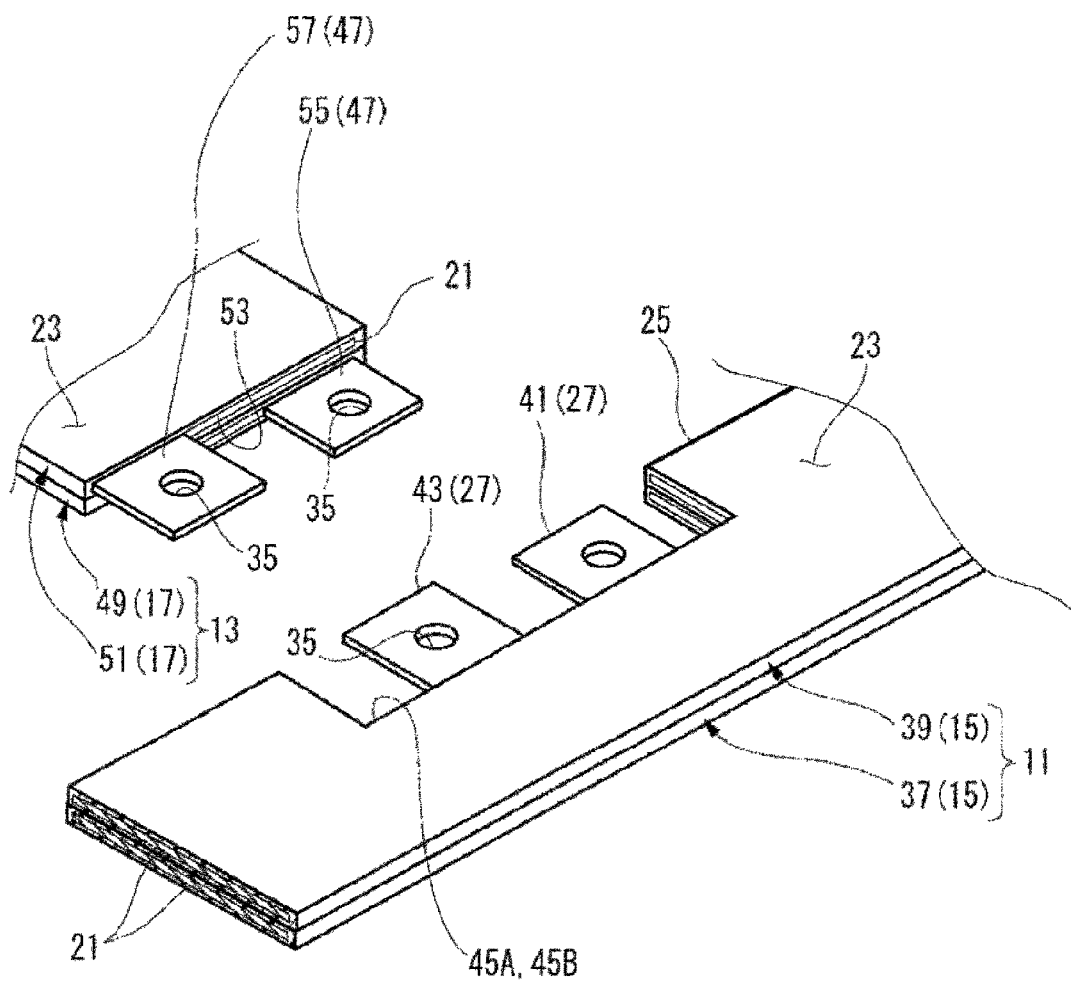
FIG. 4 is an exploded perspective view showing the laminated routing body and the counterpart laminated routing body.

FIG. 4 is an exploded perspective view showing the laminated routing body 11 and the counterpart laminated routing body 13. In the laminated routing body 11 employed in the first embodiment, the first-layer plate-like routing member 37 and the second-layer plate-like routing member 39 are laid on each other so that their recesses 45A and 45B coextend with each other. As a result, as shown in FIG. 4, the first conductor piece 41 and the second conductor piece 43 are located at different positions in the longitudinal direction in the respective recesses 45A and 45B.

In the laminated routing body 11, the plural plate-like routing members 15 may be two, three, or four circuits. Where they are two circuits as in the embodiment, the bottom layer and the top layer may be a ground layer and a power layer, respectively. Where they are three circuits, the bottom layer, the middle layer, and the top layer may be a power layer, a ground layer, and a signal layer, respectively.

Where the plural plate-like routing members 15 are four circuits, for example, the four layers may be a −48-V layer, a +48-V layer, a +12-V layer, and a −12-V layer, respectively, from the bottom. As in this lamination example, it is preferable that the plate-like routing member 15 of the second layer (+48 V) and the plate-like routing member 15 of the third layer (+12 V) which adjoin each other be of the same polarity. In a laminated routing body of plural circuits, by arranging plate-like routing members 15 of the same polarity so that they adjoin each other, crosstalk which is a phenomenon that, for example, noise is transmitted from a power layer to a signal layer can be suppressed, whereby the noise resistance can be improved.

Counterpart plate-like routing members 17 having respective counterpart conductor pieces 47 are connected to the first-layer plate-like routing member 37 and the second-layer plate-like routing member 39 of the laminated routing body 11, respectively. In the first embodiment, the counterpart plate-like routing members 17 are a first-layer counterpart plate-like routing member 49 and a second-layer counterpart plate-like routing member 51. The first-layer counterpart plate-like routing member 49 and the second-layer counterpart plate-like routing member 51 are laid on each other to constitute the counterpart laminated routing body 13.

The first-layer counterpart plate-like routing member 49 has, on both its shorter edges (i.e., the edges located at the two respective ends, in its longitudinal direction, of the band-shaped plate-like routing member 49), a first counterpart conductor piece 55 which is a continuous part of a flat conductor 21, an extension tip portion of the first counterpart conductor piece 55 being exposed from an insulative coating 23. The second-layer counterpart plate-like routing member 51 has, on one of its shorter edges, a second counterpart conductor piece 57 which is a continuous part of a flat conductor 21, an extension tip portion of the second counterpart conductor piece 57 being exposed from an insulative coating 23.

As shown in FIG. 4, the first counterpart conductor piece 55 and the second counterpart conductor piece 57 are formed at such positions as to be deviated from each other in the width direction of the counterpart laminated routing body 13 when the first-layer counterpart plate-like routing member 49 and the second-layer counterpart plate-like routing member 51 are laid on each other. The deviation between the first counterpart conductor piece 55 and the second counterpart conductor piece 57 of the counterpart laminated routing body 13 is set the same as that between the first conductor piece 41 and the second conductor piece 43 of the laminated routing body 11.

A bolt hole 35 like the one formed through the first conductor piece 41 and the second conductor piece 43 is formed through the first counterpart conductor piece 55 and the second counterpart conductor piece 57.

The conductor connection structure of plate-like routing members according to the first embodiment is equipped with the connection mechanisms 19 which connect the conductor pieces 27 to the counterpart conductor pieces 47 electrically. In the first embodiment, each connection mechanism 19 consists of a bolt hole 35, a bolt 59, and a nut 61.

That is, the first conductor piece 41 of the laminated routing body 11 is fastened to the first counterpart conductor piece 55 of the counterpart laminated routing body 13 by the bolt 59 and the nut 61 and the second conductor piece 43 of the laminated routing body 11 is fastened to the second counterpart conductor piece 57 of the counterpart laminated routing body 13 by the bolt 59 and the nut 61. The connection portions between the laminated routing body 11 and the counterpart laminated routing body 13 are covered with, for example, a housing made of an insulative resin when necessary.

Next, workings of the above-configured conductor connection structure of plate-like routing members will be described.

In the conductor connection structure of plate-like routing members according to the first embodiment, each band-shaped plate-like routing member 15 is formed with, on its one longer edge 25, the conductor piece 27 which is a continuous part of the flat conductor 21, an extension tip portion of the conductor piece 27 being exposed from the insulative coating 23. The flat conductor 21 of the associated counterpart plate-like routing member 17 is connected to this plate-like routing member 15. The counterpart plate-like routing member 17 is formed with, on the one shorter edge 53 (i.e., on one shorter edge located at one end, in its longitudinal direction, of the band-shaped plate-like routing member 49), the counterpart conductor piece 47 which is a continuous part of the flat conductor 21. That is, the band-shaped counterpart plate-like routing member 17 extends perpendicularly to and is electrically connected to the side edge of the band-shaped plate-like routing member 15. Since the plate-like routing member 15 and the counterpart plate-like routing member 17 are connected to each other by directly connecting the exposed conductor piece 27 and counterpart conductor piece 47 of their flat conductors 21 by the connection mechanism 19 having the bolt 59 and the nut 61, it is not necessary to prepare a connector.

The conductor piece 27 and the counterpart conductor piece 47 can be formed easily by pressing the flat conductor 21. Thus, in the conductor connection structure of plate-like routing members according to the first embodiment, unlike in the conventional method, it is not necessary to prepare plural electric wires having different lengths that are suitable for an associated circuit and do complicated work of, for example, arranging end portions of the respective electric wires at respective welding positions and welding them.

In the conductor connection structure of plate-like routing members according to the first embodiment, each conductor piece 27 is formed by removing the portion(s) 33, located on the one longer edge 25 and having the prescribed shape(s), of the plate-like routing member 15 by press working. For example, the portion 33, located on the one longer edge 25 and having approximately a U shape, of the plate-like routing member 15 is removed, whereby the conductor piece 27 is formed on the one longer edge 25 of the plate-like routing member 15 so as to project from the bottom of the recess 45A or 45B.

Thus, the conductor piece 27 exists within the recess 45A or 45B, that is, does not project outward beyond the one longer edge 25 in the width direction (which is perpendicular to the longitudinal direction of the plate-like routing member 15). Existing within the recess 45A or 45B, the conductor piece 27 is less prone to receive interference from other members. That is, the conductor piece 27 is less prone to be deformed or damaged by external force that is incurred by, for example, a collision with another member. In addition, since the conductor piece 27 exists within the recess 45A or 45B, the space that is occupied by the conductor connection structure can be reduced.

Furthermore, in the conductor connection structure of plate-like routing members according to the first embodiment, the two connection mechanisms 19 can be disposed adjacent to each other in the recesses 45A and 45B at approximately the same positions of the plate-like routing members 15 that are laid on each other, whereby connection work is made easier. Two circuits can be connected without changing the dimensions of the respective plate-like routing members 15 in their width direction. Since the two plate-like routing members 15 are used which are formed with the respective conductor pieces 27 at the prescribed positions in advance, the two conductor pieces 27 can be disposed at the prescribed positions in the recesses 45A and 45B merely by laying the plate-like routing members 15 on each other.

Figure 5:
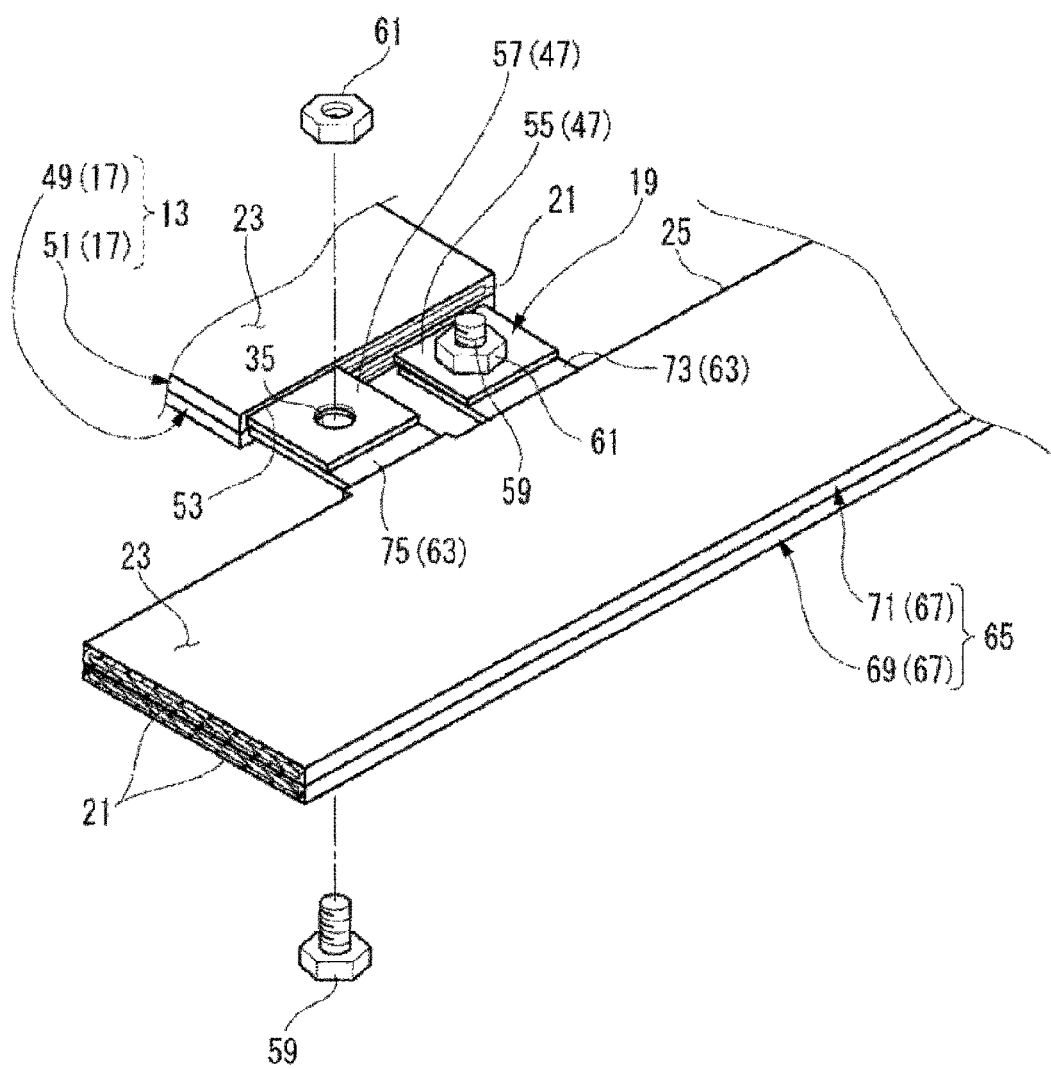
FIG. 5 is a perspective view of a conductor connection structure of plate-like routing members according to a second embodiment of the invention which includes a laminated routing body and a counterpart laminated routing body.

Next, a conductor connection structure of plate-like routing members according to a second embodiment of the invention will be described. FIG. 5 is a perspective view of a conductor connection structure of plate-like routing members according to a second embodiment of the invention which includes a laminated routing body 65 and a counterpart laminated routing body 13.

In the conductor connection structure of plate-like routing members according to the second embodiment, a conductor piece 63 projects from one longer edge 25 of each plate-like routing member 67. The other part of the configuration of this conductor connection structure of plate-like routing members is the same as that of the conductor connection structure of plate-like routing members according to the first embodiment.

Figure 6:
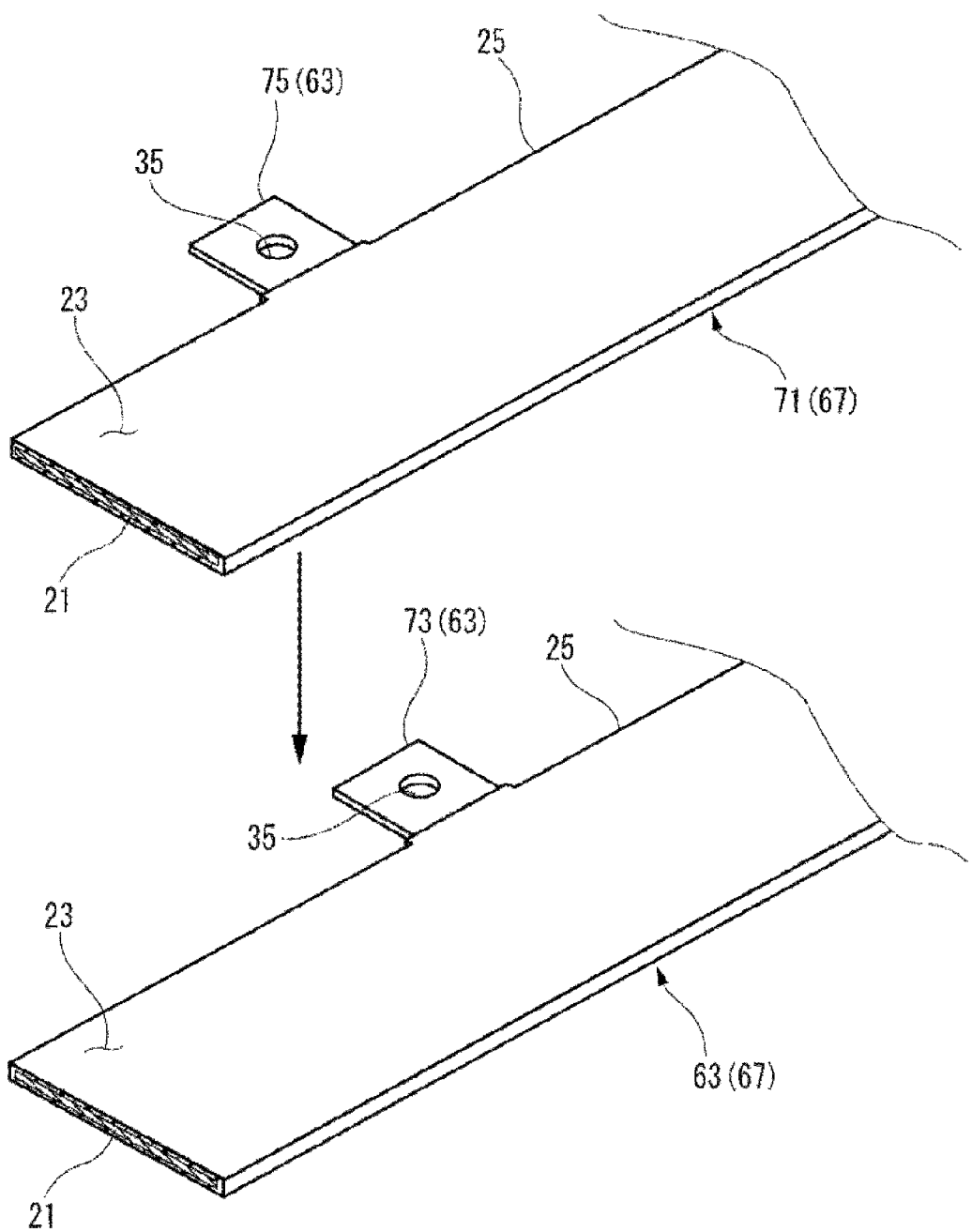
FIG. 6 is an exploded perspective view of the laminated routing body shown in FIG. 5.

FIG. 6 is an exploded perspective view of the laminated routing body 65 shown in FIG. 5. A first conductor piece 73 and a second conductor piece 75 project outward from the one longer edges 25 of a first-layer plate-like routing member 69 and a second-layer plate-like routing member 71 of the laminated routing body 65, respectively. That is, unlike the first-layer plate-like routing member 37 and the second-layer plate-like routing member 39 of laminated routing body 11 employed in the first embodiment, the first-layer plate-like routing member 69 and the second-layer plate-like routing member 71 are not formed with the recess 45A or 45B.

According to the conductor connection structure of plate-like routing members of the second embodiment, since the first-layer plate-like routing member 69 and the second-layer plate-like routing member 71 are not formed with a recess, they have no portion where the sectional area of the flat conductor 21 is small.

As described above, the conductor connection structure of plate-like routing members according to each of the first and second embodiments can decrease the number of components by dispensing with connectors as well as make connection work easier.

The invention is not limited to the above embodiments. Combining components of the different embodiments and an act, made by those skilled in the art, of modifying or applying each embodiment on the basis of the disclosure of the specification and known techniques are expected by the invention and included in the scope of protection.

For example, in each of the above embodiments, each plate-like routing member 15 or 67 is formed with, on one longer edge 25, the conductor piece 27 or 63 which is a continuous part of the flat conductor 21, an extension tip portion of the conductor piece 27 or 63 being exposed from the insulative coating 23. However, the invention requires that each plate-like routing member 15 or 67 be formed with at least one conductor piece 27 or 63 on its at least one longer edge 25; each plate-like routing member 15 or 67 may be formed with plural conductor pieces 27 or 63 on both its longer edges 25.

In a laminated routing body that is formed by laying plural plate-like routing members 15 or 67 on each other, only a prescribed flat conductor(s) 21 may be formed with a conductor piece 27 or 63 on its longer edge 25. In a counterpart laminated routing body that is formed by laying plural counterpart plate-like routing members 17 on each other, only a prescribed flat conductor(s) 21 may be formed with a counterpart conductor piece 47 on its shorter edge 53. In this manner, the connection circuit structure of the laminated routing body and the counterpart laminated routing body can be changed as appropriate.

In each of the above embodiments, each connection mechanism 19 which connects the conductor piece 27 or 63 and the counterpart conductor piece 47 electrically has the bolt 59 and the nut 61. However, in the invention, each connection mechanism may be one utilizing any of known such techniques as welding, compression bonding, and pressure welding.

Features of the conductor connection structures of plate-like routing members according to the embodiments of the invention will now be summarized concisely below in the form of items [1] to [3]:

[1] A conductor connection structure of plate-like routing members, the conductor connection structure comprising:
a first plate-like routing member (15) including:
a first flat conductor (21) having a band-shape; and
a first insulative coating (23) which covers an outer surface of the first flat conductor (21), and the first plate-like routing member (15) being formed with, at one longer edge thereof, a first conductor piece (27) that is continuously extended from the first flat conductor (21) as a part of the first flat conductor (21) and that is exposed from the first insulative coating (23);
a second plate-like routing member (17) including:
a second flat conductor (21) having a band-shape; and
a second insulative coating (23) which covers an outer surface of the second flat conductor (21), and the second plate-like routing member (17) being formed with, at one shorter edge thereof, a second conductor piece (47) that is continuously extended from the second flat conductor (21) as a part of the second flat conductor (21) and that is exposed from the second insulative coating (23); and
a connection mechanism (19) which connects the first conductor piece (27) and the second conductor piece (47) to each other electrically.

[2] The conductor connection structure of plate-like routing members according to item [1], wherein the first conductor piece (27) is formed by removing a portion (33), located at the one longer edge of the first plate-like routing member (15) and having a prescribed shape.

[3] The conductor connection structure of plate-like routing members according to item [1] or [2], further comprising:
a third plate-like routing member (15,39) including:
a third flat conductor (21) having a band-shape; and
a third insulative coating (23) which covers an outer surface of the third flat conductor (21), and the third plate-like routing member (15,39) being formed with, at one longer edge thereof, a third conductor piece (27) that is continuously extended from the third flat conductor (21) as a part of the third flat conductor (21) and that is exposed from the third insulative coating (23);
wherein when the first plate-like routing member (15,37) and the third plate-like routing member (15,39) are laid on each other, the first conductor piece (27,41) and the third conductor piece (27,43) are spaced from each other and are located close to each other.

[4] The conductor connection structure of plate-like routing members according to any one of items [1] to [3], wherein the one longer edge is one of both side edge portions of the first plate-like routing member (15) in a direction perpendicular to an extending direction of the first plate-like routing member (15).

[5] The conductor connection structure of plate-like routing members according to any one of items [1] to [3], wherein the one shorter edge is one of both side edge portions of the second plate-like routing member (17) in an extending direction of the second plate-like routing member (17).

What is claimed is:

1. A conductor connection structure of plate-like routing members, the conductor connection structure comprising:
a first plate-like routing member including:
a first flat conductor having a band-shape; and
a first insulative coating which covers an outer surface of the first flat conductor, and the first plate-like routing member being formed with, at one longer edge thereof, a first conductor piece that is continuously extended from the first flat conductor as a part of the first flat conductor and that is exposed from the first insulative coating;
a second plate-like routing member including:
a second flat conductor having a band-shape; and
a second insulative coating which covers an outer surface of the second flat conductor, and the second plate-like routing member being formed with, at one shorter edge thereof, a second conductor piece that is continuously extended from the second flat conductor as a part of the second flat conductor and that is exposed from the second insulative coating; and
a connection mechanism which connects the first conductor piece and the second conductor piece to each other electrically.

2. The conductor connection structure according to claim 1, wherein the first conductor piece is formed by removing a portion, located at the one longer edge of the first plate-like routing member and having a prescribed shape.

3. The conductor connection structure according to claim 1, further comprising:
a third plate-like routing member including:
a third flat conductor having a band-shape; and a third insulative coating which covers an outer surface of the third flat conductor, and the third plate-like routing member being formed with, at one longer edge thereof, a third conductor piece that is continuously extended from the third flat conductor as a part of the third flat conductor and that is exposed from the third insulative coating;

wherein when the first plate-like routing member and the third plate-like routing member are laid on each other, the first conductor piece and the third conductor piece are spaced from each other and are located close to each other.

4. The conductor connection structure according to claim 1, wherein the one longer edge is one of both side edge portions of the first plate-like routing member in a direction perpendicular to an extending direction of the first plate-like routing member.

5. The conductor connection structure according to claim 1, wherein the one shorter edge is one of both side edge portions of the second plate-like routing member in an extending direction of the second plate-like routing member.

* * * * *